United States Patent [19]

Ross

[11] Patent Number: 4,882,697
[45] Date of Patent: Nov. 21, 1989

[54] STABILIZATION CONTROL CIRCUIT FOR VERTICAL POSITION IN AN INERTIAL NAVIGATOR

[75] Inventor: Hugh C. Ross, Clearwater, Fla.

[73] Assignee: Honeywell Inc., Minneapolis, Minn.

[21] Appl. No.: 39,497

[22] Filed: Apr. 16, 1987

[51] Int. Cl.[4] .............................................. G06F 15/50
[52] U.S. Cl. ..................................... 364/454; 364/433
[58] Field of Search ............... 364/449, 453, 454, 433, 364/559, 565, 571.02; 342/107, 108, 450, 461, 462

[56] References Cited

U.S. PATENT DOCUMENTS

| | | | |
|---|---|---|---|
| 4,106,094 | 8/1978 | Land | 364/453 |
| 4,495,580 | 1/1985 | Keearns | 364/454 |
| 4,538,230 | 8/1985 | Reust et al. | 364/433 |

OTHER PUBLICATIONS

"Optimizing the Gains of the Baro-Inertial Vertical Channel", by Widnall, Annual of Guidance and Control, vol. 3 (1980), Mar.-Apr., No. 2, New York.

Primary Examiner—Gary Chin
Attorney, Agent, or Firm—Robert A. Pajak

[57] ABSTRACT

Vertical velocity and vertical position of an aircraft are derived from the vertical acceleration and a measurement of altitude based on barometric pressure. An acceleration correction signal and a velocity correction signal are derived from an altitude error signal and the rate of change of altitude based on the barometric altimeter. The acceleration correction signal and velocity correction signal functions are such that the acceleration correction signal and the velocity correction signal are responsive to rapid climbs and dives of the aircraft.

7 Claims, 2 Drawing Sheets

STABILIZATION CONTROL CIRCUIT FOR VERTICAL POSITION IN AN INERTIAL NAVIGATOR

The present invention generally relates to inertial navigational systems. More specifically, the invention relates to a control system circuit for providing output signals representative of vertical velocity and vertical position of an aircraft.

BACKGROUND OF THE INVENTION

Inertial navigational systems for aircraft usually employ a triad of accelerometers in combination with a triad of angular rate sensors for providing velocity and position information to a navigation computer. Specifically, from continuous knowledge of the vertical acceleration, i.e., perpendicular to the earth's surface, one can determine the vertical velocity and vertical position by time integration of the vertical acceleration as is well known.

Simple integration of vertical acceleration to provide vertical velocity, and integration of the vertical velocity to provide vertical position will result in the vertical axis information of an inertial navigator to have unbounded error due to two causes. First, error in the measurement of vertical acceleration (vertical acceleration being determined as a function of the three accelerometers) is directly integrated to cause a vertical velocity error and a vertical position error. Second, the erroneous vertical position error results in an error in the computer derived vertical-gravity component which, in turn, causes an even faster growth in vertical position error in the overall inertial navigation system.

To avoid the altitude diversion problem as just presented, it is common practice to blend the inertial altitude measurement from the primary control system, i.e. accelerometers and gyros, with the altitude derived from a barometric altimeter. The barometric altimeter being a well known device for providing altitude information as a direct function of the value of the barometric pressure.

In the prior art, the barometric altitude and the vertical position signal from the inertial system are compared to generate an altitude error signal. In turn, an acceleration correction or stabilization signal is derived as a function of the altitude error signal and used for modification of the inertial system vertical acceleration output before integration to determine vertical velocity. Further, a velocity correction or stabilization signal as a function of the altitude error signal is combined with the vertical velocity signal before integration to obtain the inertial vertical position. Although prior art control loops, constructed in a manner as just indicated, have been successful, they lack accuracy needed in some applications where the aircraft has to perform accurate flight patterns including rapid dive and climb operations.

BRIEF DESCRIPTION OF THE INVENTION

An object of the present invention is to provide a stabilization control scheme for providing accurate vertical velocity and vertical position information for an aircraft in the presence of rapid dive and climb rates of the aircraft.

The present invention provides an inertial control system for providing vertical velocity and vertical position information for an aircraft. In the present invention vertical velocity is determined as a function of vertical acceleration of the aircraft and a correction signal. The vertical acceleration correction signal is a function of the barometric altitude and an altitude error signal. The altitude error signal is the difference between the inertially determined vertical position and the barometric altitude. The vertical acceleration correction signal is the altitude error signal and its integral multiplied by variable values which are a function of the time differentiation of the barometric altitude. The correction signal function includes variable gains determined by time differentiation of the barometric altitude. Vertical position of the aircraft is determined as a function of the derived vertical velocity corrected by a vertical velocity correction signal. In the present invention, the vertical velocity correction signal is a time independent function of the altitude error signal multiplied by a variable gain which is a function of the time differentiation of the barometric altitude.

DETAILED DESCRIPTION OF THE INVENTION

Figure 1:
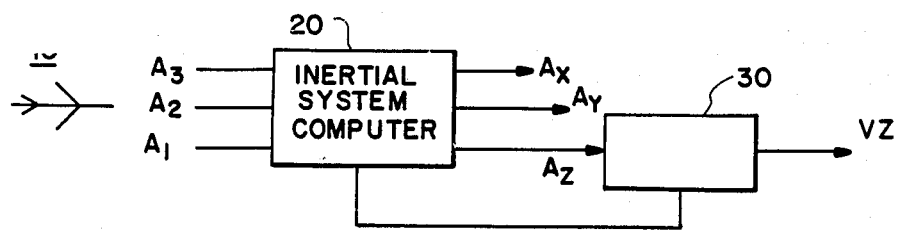
FIG. 1 is a block diagram of a typical inertial navigation control system.

Shown in FIG. 1 is a simplified block diagram of a inertial navigation control system. Only that portion of the inertial navigation system which is related to the present invention is shown. There shown in FIG. 1 is an aircraft 10 which includes a triad of accelerometers having outputs $A_1$, $A_2$ and $A_3$ presented as inputs to an inertial navigation system computer 20. Typically, the triad of accelerometers are orthogonally positioned relative to each other in order to provide orthogonal components of acceleration. After initialization of the inertial system computer, the system computer can calculate the orthogonal components of acceleration AX, AY and AZ, where the acceleration AZ is identified as the acceleration in the vertical direction, i.e., perpendicular to the earth's surface. Because gravitation and the earth's radius are part of the systems equation used by the inertial system computer 20, vertical position information is also provided as input to system computer 20. The system of FIG. 1 as just briefly described is well known to those skilled in the art of an inertial navigation control systems.

It should be understood that any errors or bias in the acceleration inputs $A_1$, $A_2$, and $A_3$ and the vertical position input PZ will particularly impact the value of the vertical acceleration output AZ. Of course, any errors in AZ and PZ will ultimately affect the determination of the vertical position of the aircraft and its flight operations.

Figure 2:
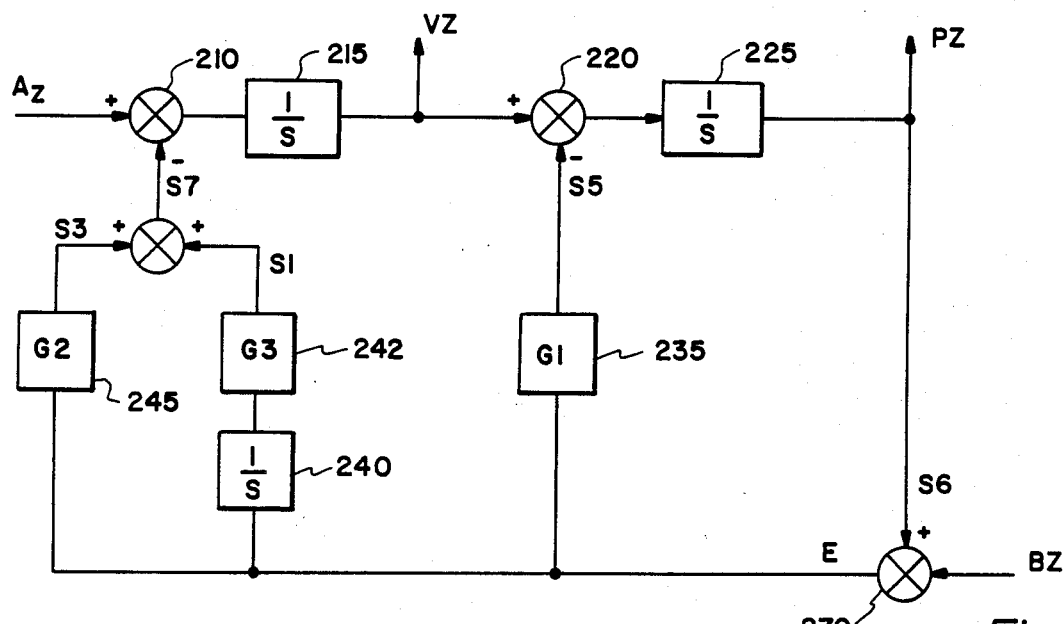
FIG. 2 is a block diagram of an inertial control system of the prior art for providing vertical velocity and vertical position information for an aircraft.

FIG. 2 illustrates a control system for determining the vertical position PZ as a function of the inertially sensed vertical acceleration AZ and the barometric altitude signal BZ derived from a barometric altimeter. The vertical velocity output signal VZ is the integration 215 of the signal difference between signals AZ and the acceleration correction signal S7. The vertical position signal PZ, i.e., the altitude, is the integration 225 of the signal difference between the vertical velocity signal VZ and a velocity correction signal S5.

Circuit means 210 shown as a "summing means" performs the signal difference operation between signals AZ and S7, and circuit means 220 performs the signal difference operation between signals VZ and S5. Circuit means 230 provides an error signal "E" as the difference between the vertical position signal PZ minus the barometric altitude signal BZ. The velocity correction signal S5 is shown as the error signal E multiplied by fixed gain G1.

The acceleration correction signal S7 is a sum 250 of signals S1 and S3. S3 being the error signal E multiplied by a fixed gain G2, and signal S1 is the integration 240 of the error signal E multiplied by fixed gain G3. The value of G2 is in the order of twice the gravitational force divided by the earth's radius, and the value of G3 is in the order of 1.0E-06. The integral feedback provided by the circuitry of integrator block 240 and gain block 242 provides a delay time in the order of 50 to 100 seconds. This latter mentioned circuit provides a feedback dampening loop to filter measurement noise contained in the barometric altitude signal BZ.

Operation of the control system of FIG. 2 will now be described. Calculation of the vertical position PZ using the acceleration measurement AZ derived from inertial sensors is an inherently unstable process. This is so, since PZ is used by computer 20 to calculate the value of gravity. The value of gravity is taken into consideration for the determination of the output AZ as substantially illustrated in FIG. 1. In effect, this is positive feedback around a loop from PZ to AZ and back through the two integrators 215 and 225. This feedback is small—approximately two times the value of gravity divided by the earth's radius. However, even though the feedback is small, the loop does diverge causing unacceptably large errors, after several minutes, if undamped.

As illustrated in the prior art of FIG. 2, the barometric altitude BZ is used for damping. Velocity correction single S5 provides proportional feedback dependent upon the error signal E. Acceleration correction signal S7 provides integral plus proportional feedback, S1 and S3 respectably, also dependent upon the error signal E. The purpose of the S1 and S3 feedback signals is to zero out any offset error in the vertical acceleration input AZ. The combination of correction signals S5 and S7 provide control loop stability.

During dives and climbs, the barometric altitude signal BZ can have large errors and thereby introduce large transient system errors in the vertical position PZ, and vertical velocity VZ, and vertical acceleration AZ. In accordance with present invention, the system of FIG. 2 may be provided with added stabilization as will be now described with reference to FIG. 3.

Figure 3:
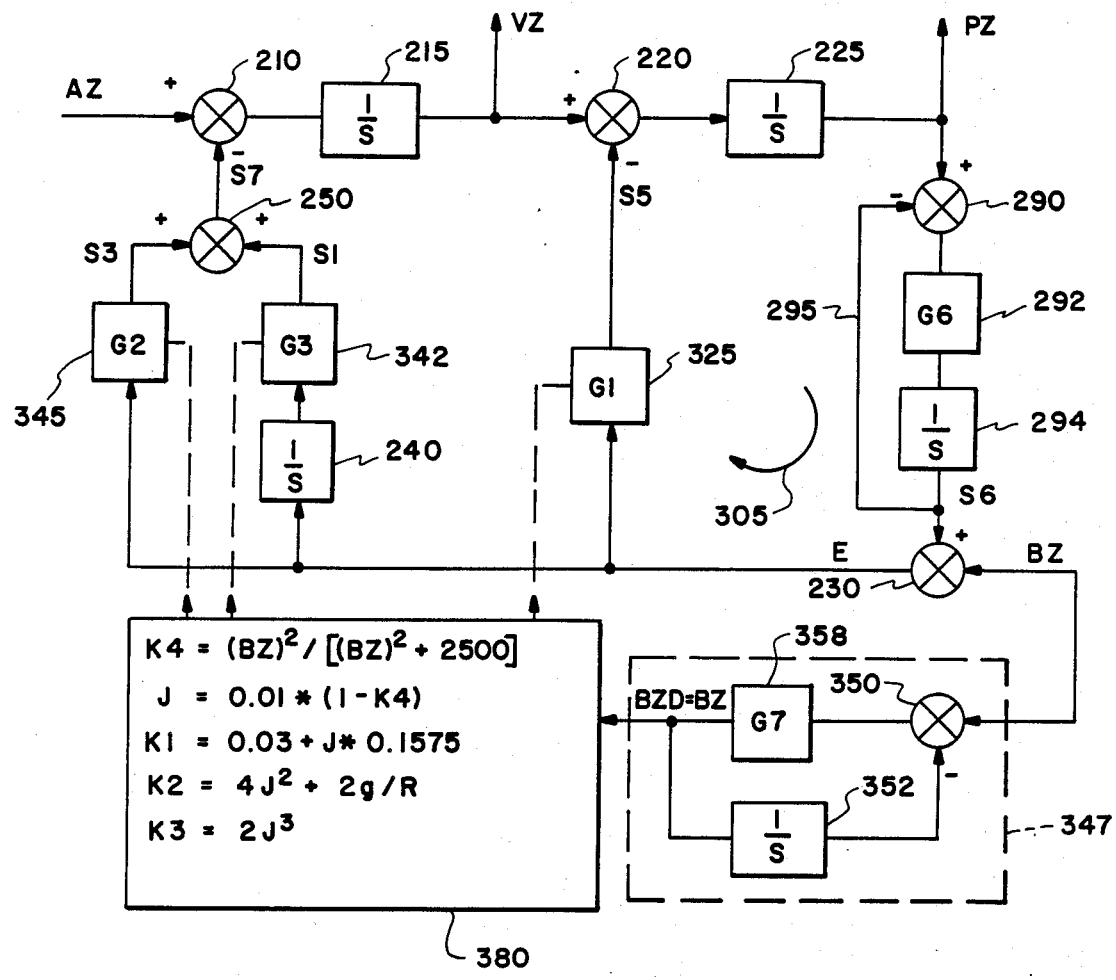
FIG. 3 is a block diagram of a vertical stabilization control system in accordance with the present invention.

Referring now to FIG. 3, there shown is a control system similar to that shown in FIG. 2 with similar functioning and arranged components in FIG. 3 having the same numeral designations as in the previously described FIG. 2. Added to the circuit of FIG. 2, as illustrated in FIG. 3, is a time differentiation circuit 347 for determining the time differentiation value BZD of BZ with time lag. The output of circuit 347 is presented to a gain control block 380 having output signals for controlling variable gain blocks or multipliers as will be subsequently described.

The circuit of FIG. 3 includes variable gain blocks 325, 345, and 342 substituted for fixed gain blocks 235, 245, and 242, respectively. Blocks 325, 345, and 342 provide variable gains of K1, K2, and K3, respectively. The variable gains K1, K2, and K3 are under control of gain control block 380. The values of the variable gains K1, K2, and K3 will be further described.

In the present invention as illustrated in FIG. 3, the time differentiated output BZD is presented to gain control block 380 for determining values of K1, K2 and K3 as follows:

$$K1 = 0.03 + 0.1575 * X$$

$$K2 = 4\ Y^2 + 2g/R$$

$$K3 = 2\ Y^3$$

where $$X = \frac{BZD^2}{BZD^2 + 50^2}$$

$Y = 0.01*(1-X)$
$g$ = earth's gravitational force
$R$ = earth's radius
$BZD$ = Filtered derivative barometric altitude In turn, gain control block 380 is coupled to gain blocks 325, 345, and 342 for providing appropriate output signals to variably control the gain values of K1, K2, and K3, respectively, of gain blocks 335, 345, and 342.

Gain control block 380 may be constructed from a wide variety of analog and digital circuits well known in the art. The signal outputs from gain control block 380 to control variable gain blocks 325, 342, and 345 depend upon the implementation of these blocks. In the preferred embodiment of the present invention, it is intended that gain control block 380, as well as the variable gain blocks 325, 342, and 345 are all part of the inertial navigation computer.

Time differentiation circuit 347 includes means 350 for providing a difference between the input signal BZ and the integral 352 of the time differentiated output BZD. The output of means 350 is presented through gain block 358 having a gain value of G7. The combination of circuit blocks 350, 352, and 358 provide the time differentiated value BZD of the barometric altitude BZ with high frequency noise roll off and a time delay or lag.

Further shown in FIG. 3 is time delay circuit 390 between the output signal PZ and summing means 230. Circuit 390 is shown comprised of summing means 290, gain block 292 having gain G6, and integrator 294 having an output signal S6 which is also fed back to summing means 290. Summing means 290 performs the difference function between the vertical altitude PZ and the integrator 294 output signal. Circuit 347 as just described is intended to provide a delay of the presentation of the vertical velocity signal PZ to summing means 230 for determination of the altitude error signal E. The amount of delay is intended to be substantially that delay which is inherent in the barometric altimeter. The intended delay is comparatively short, and is in the order 3 seconds for values of G6 equal to 0.333.

The control system as described by FIG. 3 will now be described. During dives and climbs there can exist barometric altitude errors which can introduce large transient errors in AZ, VZ, and PZ. The variable loop gains K1, K2, and K3 take advantage of the short term (5 minutes) stability of the inertial calculation by computer 20 for determining AZ and the fact that the dive and climb durations are short, for example 1 minute. During dives and climbs the rate of change of barometric altitude output BZD is sufficiently large such that the variable gains of K2 and K3 are reduced, and approach zero. This essentially opens the acceleration correction loop and thereby minimizes the effect of barometric altitude signal errors into the input of integrator 215 and the resultant vertical velocity VZ. At the same time, the gain K1 is increased so that the control loop 305 operates in a manner that PZ more closely tracks signal BZ such that error signal E approaches zero.

At the end of the climb or dive, when level flight resumes, the previous gain values of K1, K2, and K3 are not immediately changed but rather maintain there dive/climb values for a short time after level flight is resumed. This time delay is predominately controlled by the circuit of block 347, and specifically the value of gain G7 of block 358. This short time delay in maintaining the variable gains K1, K2, and K3 further minimizes errors.

While the invention has been described in its preferred embodiment, it is to be understood that the words which have been used are words of description rather than a limitation and that changes may be made without departing from the true spirit and intent of the present application.

Specifically, it should be understood, that the control system described by the block diagram of FIG. 3 may be implemented entirely by software in a computer. Referring to FIG. 1, it should be recognized by those skilled in the art that the control system block 30 may be entirely incorporated into the inertial system computer 20. On the otherhand, it should also be recognized by those skilled in the art that the circuit of FIG. 3 may be implemented by a wide variety of analog and digital circuits. Specifically, any of the time delays may be incorporated by a variety of techniques including digital time delay circuits.

I claim:

1. An apparatus for providing signals representative of vertical velocity and vertical position of an aircraft comprising:
    first means for generating a first signal representative of vertical acceleration of said aircraft;
    second means for generating a second signal representative of the altitude of said aircraft derived from a barometric altimeter;
    third means for integrating the sum of said first signal and an acceleration correction signal to provide a vertical velocity output signal representative of the vertical velocity of said aircraft;
    fourth means for integrating the sum of said vertical velocity output signal and a velocity correction signal to provide a vertical position output signal representative of the vertical position of said aircraft;
    fifth means for time differentiating said second signal and providing a third signal representative of said time differentiation of said second signal;
    sixth means for generating an altitude error signal representative of the difference between said vertical position signal and said second signal;
    seventh means for generating said velocity correction signal as a first function of said altitude error signal multiplied by a first variable gain value;
    means for deriving said first variable gain value as a first selected function of said third signal, and in which said first variable gain value increases in value with increasing values of said third signal; and
    eighth means for generating said acceleration correction signal as a second function of said altitude error signal, said second function including second and third variable gain values;
    means for deriving said second and third variable gain values as second and third selected functions of said third signal, respectively, in which said second and third variable gain values decrease in value with increasing values of said third signal, such that said second function of said altitude error signal decreases in value for increasing values of said third signal.

2. The apparatus of claim 1 wherein said sixth means is operative for generating said altitude error signal as the difference between the instantaneous value of said second signal and said vertical position signal delayed a selected time before said instantaneous value of said second signal.

3. The apparatus of claim 1 wherein said acceleration correction signal includes the sum of:
    (i) said altitude error signal multiplied by said second variable gain value, and
    (ii) the time integrated value of said altitude error signal multiplied by said third variable gain value.

4. The apparatus of claim 3 wherein said first, second and third variable gain values are related to said third signal by:

$$\text{First value} = C_1 + C_2 * X$$

$$\text{Second value} = C_3 * Y^2 + C_4, \text{ and}$$

$$\text{Third value} = C_5 * Y^3$$

where $$X = \frac{(BZD)^2}{BZD^2 + C_6}$$

BZD = said third signal,
Y = $C_7$, and
$C_1$, $C_2$, $C_3$, $C_4$, $C_5$, $C_6$, and $C_7$ are selected constant coefficients.

5. The apparatus of claim 1 wherein said fifth means includes means for filtering high frequency noise of said second signal.

6. The apparatus of claim 1 wherein said fifth means includes the delay means for time delaying said third signal response to changes in said second signal.

7. An apparatus for providing signals representative of vertical velocity and vertical position of an aircraft comprising:
    first means for generating a first signal representative of vertical acceleration of said aircraft;
    second means for generating a second signal representative of the altitude of said aircraft derived from a barometric altimeter;
    third means for integrating the sum of said first signal and an acceleration correction signal to provide a vertical velocity output signal representative of the vertical velocity of said aircraft;
    fourth means for integrating the sum of said vertical velocity output signal and a velocity correction signal to provide a vertical position output signal representative of the vertical position of said aircraft;

fifth means for time differentiating said second signal and providing a third signal representative of said time differentiation of said second signal;

sixth means for generating an altitude error signal representative of the difference between said vertical position signal and said second signal;

seventh means for generating said velocity correction signal as a first function of said altitude error signal and said third signal such that during climbs and dives of sufficient magnitude, the resultant altitude error signal approaches zero; and eighth means for generating said acceleration correction signal as a second function of said altitude error signal and said third signal such that as said third signal increases said acceleration correction signal approaches zero.

* * * * *